(12) United States Patent
Tomatsu et al.

(10) Patent No.: US 11,866,572 B2
(45) Date of Patent: Jan. 9, 2024

(54) POLYOLEFIN-BASED RESIN FILM AND LAMINATE INCLUDING THE SAME

(71) Applicant: TOYOBO CO., LTD., Osaka (JP)

(72) Inventors: Wakato Tomatsu, Inuyama (JP); Tadashi Nishi, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 19 days.

(21) Appl. No.: 17/619,691

(22) PCT Filed: May 26, 2020

(86) PCT No.: PCT/JP2020/020688
§ 371 (c)(1),
(2) Date: Dec. 16, 2021

(87) PCT Pub. No.: WO2020/255642
PCT Pub. Date: Dec. 24, 2020

(65) Prior Publication Data
US 2022/0356335 A1 Nov. 10, 2022

(30) Foreign Application Priority Data

Jun. 20, 2019 (JP) .................. 2019-114735

(51) Int. Cl.
| | | |
|---|---|---|
| *B32B 27/08* | (2006.01) | |
| *C08L 23/14* | (2006.01) | |
| *B32B 27/32* | (2006.01) | |
| *B32B 27/34* | (2006.01) | |
| *C08J 5/18* | (2006.01) | |
| *C08L 23/12* | (2006.01) | |
| *C08L 53/00* | (2006.01) | |

(52) U.S. Cl.
CPC .............. *C08L 23/14* (2013.01); *B32B 27/08* (2013.01); *B32B 27/32* (2013.01); *B32B 27/34* (2013.01); *C08J 5/18* (2013.01); *C08L 23/12* (2013.01); *C08L 53/00* (2013.01); *B32B 2250/02* (2013.01); *B32B 2250/24* (2013.01); *B32B 2307/31* (2013.01); *B32B 2307/412* (2013.01); *B32B 2307/518* (2013.01); *B32B 2307/536* (2013.01); *B32B 2307/7246* (2013.01); *B32B 2323/10* (2013.01); *B32B 2377/00* (2013.01); *B32B 2439/06* (2013.01); *B32B 2439/46* (2013.01); *B32B 2439/70* (2013.01); *C08L 2201/10* (2013.01); *C08L 2201/14* (2013.01); *C08L 2203/162* (2013.01); *C08L 2205/03* (2013.01)

(58) Field of Classification Search
CPC ........... B32B 2250/02; B32B 2250/24; B32B 2307/31; B32B 2307/412; B32B 2307/518; B32B 2307/536; B32B 2307/7246; B32B 2323/10; B32B 2377/00; B32B 2439/06; B32B 2439/46; B32B 2439/70; B32B 27/08; B32B 27/32; B32B 27/34; B32B 2255/10; B32B 2255/26; B32B 2264/1021; B32B 2264/303; B32B 2270/00; B32B 2274/00; B32B 2307/414; B32B 2307/418; B32B 2307/58; B32B 2307/5825; B32B 2307/732; B32B 2307/734; B32B 2307/746; B32B 27/16; B32B 27/18; B32B 27/36; B32B 7/12; C08J 5/18; C08J 2323/14; C08J 2353/00; C08J 2423/08; C08L 2201/10; C08L 2201/14; C08L 2203/162; C08L 2205/03; C08L 23/12; C08L 23/14; C08L 53/00; B29C 55/06; B29C 61/06

See application file for complete search history.

(56) References Cited

U.S. PATENT DOCUMENTS

| | | |
|---|---|---|
| 2010/0055429 A1 | 3/2010 | Lee et al. |
| 2012/0003412 A1 | 1/2012 | Yuno et al. |
| 2012/0094042 A1 | 4/2012 | Lee et al. |

(Continued)

FOREIGN PATENT DOCUMENTS

| | | |
|---|---|---|
| JP | 2002-003619 A | 1/2002 |
| JP | 5411935 B2 | 2/2014 |

(Continued)

OTHER PUBLICATIONS

Japanese Patent Office, International Search Report in International Patent Application No. PCT/JP2020/020688 (dated Aug. 4, 2020).
China National Intellectual Property Administration, First Office Action in Chinese Patent Application No. 202080044210.4 (dated Feb. 22, 2023).

(Continued)

*Primary Examiner* — Lawrence D Ferguson
(74) *Attorney, Agent, or Firm* — Leydig, Voit & Mayer, Ltd.

(57) ABSTRACT

The invention provides a polyolefin-based resin film including a polyolefin-based resin composition that includes at least a propylene-α olefin random copolymer, wherein (1) an olefin-based block copolymer is 0 to 2 parts by weight based on 100 parts by weight of the propylene-α olefin random copolymer; (2) an olefin-based copolymeric elastomer resin is 0 to 2 parts by weight based on 100 parts by weight of the propylene-α olefin random copolymer; (3) a propylene homopolymer is 0 to 40 parts by weight based on 100 parts by weight of the propylene-α olefin random copolymer; (4) the polyolefin-based resin film exhibits a thermal shrinkage rate of 25% or less in a direction in which the thermal shrinkage rate is larger between a longitudinal direction and a lateral direction; and (5) a planar orientation coefficient ΔP calculated from a refractive index of the polyolefin-based resin film is 0.0100-0.0145.

9 Claims, No Drawings

(56) References Cited

U.S. PATENT DOCUMENTS

| | | |
|---|---|---|
| 2012/0251749 A1 | 10/2012 | Lee et al. |
| 2014/0027348 A1 | 9/2014 | Lee et al. |
| 2014/0272348 A1 | 9/2014 | Lee et al. |
| 2015/0028515 A1 | 1/2015 | Lee et al. |
| 2021/0213720 A1 | 7/2021 | Yoshii et al. |

FOREIGN PATENT DOCUMENTS

| | | |
|---|---|---|
| JP | 2014-141302 A | 8/2014 |
| JP | 5790497 B2 | 10/2015 |
| JP | 2016-032911 A | 3/2016 |
| JP | 2018-079583 A | 5/2018 |
| WO | WO 2017/170244 A1 | 10/2017 |
| WO | WO 2019/065306 A1 | 4/2019 |
| WO | WO 2019/244708 A1 | 12/2019 |

OTHER PUBLICATIONS

Intellectual Property India, Examination Report in Indian Patent Application No. 202247001403 (dated Jul. 17, 2023).
Japan Patent Office, Office Action in Japanese Patent Application No. 2021-527502 (dated Aug. 8, 2023).
China National Intellectual Property Administration, Second Office Action in Chinese Patent Application No. 202080044210.4 (dated Sep. 11, 2023).
European Patent Office, Extended European Search Report in European Patent Application No. 20826933.2 (dated Sep. 22, 2023).

POLYOLEFIN-BASED RESIN FILM AND LAMINATE INCLUDING THE SAME

TECHNICAL FIELD

The present invention relates to a polyolefin-based resin film. The present invention also relates to a laminate including a biaxially oriented film made of at least one polymer selected from the group consisting of a polyamide resin film, a polyester resin film, and a polypropylene resin film.

BACKGROUND ART

Packaging bags are produced mainly by thermocompression bonding (hereinafter, heat-sealing) a peripheral portion of a laminate of a base film such as a polyamide resin film, a polyester resin film, or a polypropylene resin film with a polyolefin-based resin film at a temperature near a melting point of the polyolefin-based resin film with polyolefin-based resin film surfaces being in contact with each other.

In food packaging bags, a heat-sealable film made of a polyolefin-based resin is often used as a film for packaging food requiring water vapor barrier properties, such as dry provisions and confections. In recent years, the demand for food packaged with a film has increased due to social backgrounds such as advancement of women into society, trend toward a nuclear family, and demographic aging, and at the same time, improvement of characteristics is further required. For example, there is a demand for improving the opening property so that even a person with weak force such as an elderly person can easily take out the contained food.

In addition, when a food content is taken out from a packaging bag, the packaging bag is often torn with fingers from an incision, a so-called notch, made in a peripheral sealed portion of the packaging bag. However, where a conventional laminate is used, a packaging bag cannot be torn in parallel with one edge, usually the horizontal direction, of the packaging bag and the packaging bag is obliquely torn, or a phenomenon in which the front-side laminate and the back-side laminate of the packaging bag are torn oppositely with respect to the vertical direction occurs, where the phenomenon is called "parting". Accordingly, there is a possibility that it becomes difficult to take out a food content and granular contents such as Furikake are spilled.

The reason why it is difficult to tear the packaging bag in parallel with one edge of the packaging bag is that a base film used for the laminate is distorted, that is, the molecular orientation axis direction of the base film is not parallel with one edge of the package.

Such a problem does not occur if the molecular orientation axis direction of the base film can be made the same with the tearing direction of the packaging bag. The molecular orientation axis direction of the lateral center of a produced wide stretched film is coincident with the machine direction of the film, so that a resulting packaging bag can be torn in parallel with one edge of the packaging bag. However, the molecular orientation axis direction at the lateral end of the film is inclined, so that the tearing direction of a resulting packaging bag is inclined. It is practically impossible to completely avoid the procurement of a base film using the lateral end of film. In addition, the degree of distortion tends to be larger than ever before due to an increase in the production speed or the width of a base film.

In addition, in a food packaging bag for dry foods, confections or the like, it is preferable that the contents are easily visually recognized.

In such circumstances, attempts have been made to solve such a problem by designing a polyolefin-based resin film to be laminated on a base film.

Patent Document 1 discloses a technique of uniaxially stretching a sheet obtained by adding a polyethylene-based resin such as linear low-density polyethylene or high-pressure low-density polyethylene to a polypropylene-based resin. However, there is a problem in film appearance.

Patent Document 2 discloses a film obtained by uniaxially stretching 3.0 times a polyolefin-based resin sheet comprising a propylene-ethylene block copolymer and an ethylene-propylene copolymer in a seal layer. However, there are problems in haze, seal strength, tear strength, and parting.

Patent Document 3 discloses a film obtained by uniaxially stretching a polyolefin-based resin sheet comprising a propylene-ethylene block copolymer, an ethylene-propylene copolymer, and a propylene-butene copolymer. However, there is a problem in visibility of contents.

In addition, Patent Document 4 discloses a technique of uniaxially stretching a polyolefin-based resin sheet containing a propylene-ethylene copolymer and a propylene-butene copolymer in a seal layer by a tenter method. However, there was a problem in bag breaking resistance.

Patent Document 5 discloses a technique of uniaxially stretching a polyolefin-based resin sheet comprising a propylene-ethylene copolymer in the longitudinal direction. However, there was a problem in piercing strength.

In addition, Patent Document 6 discloses a film prepared by uniaxially stretching 4 to 6 times a polyolefin-based resin sheet comprising a propylene-ethylene-butene random copolymer and an ethylene-butene copolymeric elastomer resin. However, there is a problem that the thermal shrinkage rate is high.

BACKGROUND DOCUMENTS

Patent Documents

Patent Document 1: JP-A-2002-003619
Patent Document 2: JP 5790497
Patent Document 3: JP 5411935
Patent Document 4: JP-A-2016-32911
Patent Document 5: JP-A-2018-79583
Patent Document 6: JP-A-2014-141302

SUMMARY OF THE INVENTION

Problems to be Solved by the Invention

An object of the present invention is to provide a polyolefin-based resin film that affords a laminate from which a packaging bag superior in transparency, bending pinhole resistance, and blocking resistance and capable of being easily torn without parting is obtained even when the polyolefin-based resin film is laminated on a base film having a large distortion of molecular orientation axis such as a biaxially stretched polyamide-based resin film.

Solutions to the Problems

As a result of intensive studies to achieve such an object, the present inventors have found that by controlling the thermal shrinkage rate in the longitudinal direction and the plane orientation coefficient of a polypropylene-based resin composition polyolefin-based resin film containing a propylene-α olefin random copolymer and an ethylene-propylene block copolymer in a specific ratio, a packaging bag produced from a laminate prepared by laminating the film with a base film having a large distortion of a molecular orientation axis, such as a biaxially oriented polyamide-based resin film, is superior in transparency, sealability, and bag-forming property and can be easily torn without parting, thereby having accomplished the present invention.

That is, the present invention includes the following aspects.

[1] A polyolefin-based resin film including a polyolefin-based resin composition,
   wherein the polyolefin-based resin composition includes at least a propylene-α olefin random copolymer and the following 1) to 5) are satisfied:
   1) a content of an olefin-based block copolymer is 0 to 2 parts by weight based on 100 parts by weight of the propylene-α olefin random copolymer in the polyolefin-based resin composition;
   2) a content of an olefin-based copolymeric elastomer resin is 0 to 2 parts by weight based on 100 parts by weight of the propylene-α olefin random copolymer in the polyolefin-based resin composition;
   3) a content of a propylene homopolymer is 0 to 40 parts by weight based on 100 parts by weight of the propylene-α olefin random copolymer in the polyolefin-based resin composition;
   4) the polyolefin-based resin film exhibits a thermal shrinkage rate after heating at 120° C. for 30 minutes of 25% or less in a direction in which the thermal shrinkage rate after heating at 120° C. for 30 minutes is larger between a longitudinal direction and a lateral direction of the polyolefin-based resin film; and
   5) a planar orientation coefficient ΔP calculated from a refractive index of the polyolefin-based resin film is 0.0100 or more and 0.0145 or less.

[2] The polyolefin-based resin film according to above [1], wherein at least one surface of the polyolefin-based resin film has a Martens hardness of 80 N/mm$^2$ or more and an indentation creep rate (Cit) of 3.0% or less.

[3] The polyolefin-based resin film according to above [1] or [2], wherein the polyolefin-based resin film has a haze of 1% or more and 20% or less.

[4] The polyolefin-based resin film according to any one of above [1] to [3], wherein the polyolefin-based resin film has a tear strength of 0.8 N or less in a direction in which the thermal shrinkage rate after heating at 120° C. for 30 minutes is larger between the longitudinal direction and the lateral direction of the polyolefin-based resin film.

[5] The polyolefin-based resin film according to any one of above [1] to [4], wherein the polyolefin-based resin film has a piercing strength of 0.12 N/μm or more.

[6] The polyolefin-based resin film according to any one of above [1] to [5], wherein a layer located on at least one surface of the polyolefin-based resin film has an anti-blocking agent concentration of 3000 ppm or less.

[7] A laminate including:
   the polyolefin-based resin film according to any one of above [1] to [6]; and
   a biaxially oriented film made of at least one polymer selected from the group consisting of a polyamide resin film, a polyester resin film, and a polypropylene resin film.

[8] The laminate according to [7], wherein the laminate has a straight cuttability of 8 mm or less in a direction in which the thermal shrinkage rate after heating at 120° C. for 30 minutes is larger between a longitudinal direction and a lateral direction of the laminate, and has a tear strength of 0.8 N or less in a direction in which the thermal shrinkage rate is larger between the longitudinal direction and the lateral direction.

[9] A package including the laminate according to above [7] or [8].

Effects of the Invention

The polyolefin-based resin film of the present invention is superior in transparency, sealability, and bag-forming property and is suitable for providing a package that can be easily torn without parting.

MODE FOR CARRYING OUT THE INVENTION

Hereinafter, the present invention will be described in detail.

The polyolefin-based resin film in the present invention is a polyolefin-based resin film mainly composed of a propylene-α olefin random copolymer.

(Propylene-α Olefin Random Copolymer)

In the present invention, examples of the propylene-α olefin random copolymer include a copolymer of propylene and at least one α-olefin having 2 or 4 to 20 carbon atoms other than propylene. As such an α-olefin monomer having 2 or 4 to 20 carbon atoms, ethylene, butene-1, pentene-1,4-methylpentene-1, hexene-1, octene-1, and the like can be used. Although not particularly limited, it is preferable to use ethylene from the viewpoint of stretchability and low shrinkage property. It is just required that one or more propylene-α olefin random copolymers are used, and two or more thereof may be used in combination as necessary. Particularly suitable are propylene-ethylene random copolymers.

The melting point of the propylene-α olefin random copolymer is preferably 125° C. or more, and more preferably 130° C. or more. When the melting point is 125° C. or more, straight cuttability is easily obtained.

The lower limit of the melt flow rate (MFR) of the propylene-α olefin random copolymer is preferably 0.6 g/10 min, more preferably 1.0 g/10 min, and further preferably 1.2 g/10 min. The uniformity of the film thickness may be impaired. The upper limit of the melt flow rate of the random copolymer is preferably 12.0 g/10 min, more preferably 9.0 g/10 min, and further preferably 8.0 g/10 min.

Specific examples thereof include a propylene-ethylene random copolymer (Prime Polypro F-724NPC manufactured by Prime Polymer Co., Ltd., MFR at 230° C. and a load of 2.16 kg: 7.0 g/10 min, melting point: 142° C.), a propylene-ethylene-butene random copolymer (Sumitomo Noblen FL8115A manufactured by Sumitomo Chemical Co., Ltd., MFR at 230° C. and a load of 2.16 kg: 7.0 g/10 min, melting point: 148° C.), a propylene-ethylene-butene random copolymer (Prime Polypro F-794NV manufactured by Prime Polymer Co., Ltd., MFR at 230° C. and a load of 2.16 kg: 5.7 g/10 min, melting point: 134° C.), and a propylene-ethylene-butene random copolymer (Sumitomo Noblen FL6745A manufactured by Sumitomo Chemical Co., Ltd., MFR at 230° C. and a load of 2.16 kg: 6.0 g/10 min, melting point: 130° C.). Particularly suitable is a propylene-ethylene-butene random copolymer in which a main monomer is propylene and a certain amount of ethylene and butene are copolymerized. In the present description, any random copolymer is expressed by calling the monomers constituting the copolymer in the descending order of the monomer composition ratio.

(Propylene-Ethylene Block Copolymer)

In the present invention, a propylene-ethylene block copolymer can be used, and the bag breaking resistance can thereby be more easily improved. The propylene-ethylene block copolymer in the present invention is a multistage copolymer resulting through a first polymerization step including a copolymerization component composed of a large amount of propylene and a small amount of ethylene and a second polymerization step including a copolymerization component composed of a small amount of propylene and a large amount of ethylene. Specifically, as disclosed in JP-A-2000-186159, it is preferable to use a copolymer obtained by performing gas phase polymerization. That is, examples thereof include, but are not limited to, block copolymers obtained by polymerizing a polymer portion (component A) mainly composed of propylene in the substantial absence of an inert solvent in the first step, and then polymerizing a copolymer portion (component B) of propylene and ethylene having an ethylene content of 20 to 50 parts by weight in a gas phase in the second step.

The melting point of the propylene-α olefin block copolymer is preferably 125° C. or more, more preferably 130° C. or more, and further preferably 140° C. or more. When the melting point is 125° C. or more, straight cuttability is easily obtained.

The melt flow rate (MFR) (measured at 230° C. and load of 2.16 kg) of the propylene-ethylene block copolymer is not particularly limited, but it is preferably 1 to 10 g/10 min, and more preferably 2 to 7. This is because when it is less than 1 g/10 min, the viscosity is excessively high and it is difficult to perform extrusion in a T-die, and conversely when it exceeds 10 g/10 min, problems such as stickiness of a film and poor impact resistance (impact strength) of a film occur.

(Copolymeric Elastomer)

In the present invention, a thermoplastic copolymeric elastomer mainly composed of a polyolefin may be added, and the bag breaking resistance is thereby easily enhanced.

Examples of the olefin-based elastomer include a polymer of an α-olefin having 2 to 20 carbon atoms or copolymer of ethylene and an α-olefin, having a melting point of preferably 110° C. or less, more preferably 100° C. or less, further preferably 80° C. or less or having no melting point observed.

Specific examples thereof include an ethylene-propylene copolymer, an ethylene-1-butene copolymer, an ethylene-1-hexene copolymer, an ethylene-4-methylpentene-1 copolymer, an ethylene-1-octene copolymer, a propylene homopolymer, a propylene-ethylene copolymer, a propylene-ethylene-1-butene copolymer, a 1-butene homopolymer, a 1-butene-ethylene copolymer, a 1-butene-propylene copolymer, a 4-methylpentene-1 homopolymer, a 4-methylpentene-1 propylene copolymer, a 4-methylpentene-1-1-butene copolymer, a 4-methylpentene-1 propylene-1-butene copolymer, and a propylene-1-butene copolymer.

Among ethylene-butene copolymeric elastomers, amorphous or low crystalline elastomers obtained by copolymerizing ethylene and butene are preferable. As an olefin-based thermoplastic copolymeric elastomer that exhibits a relatively high Shore hardness and good transparency, propylene-butene copolymeric elastomers which are crystalline elastomers obtained by copolymerizing propylene and butene, or mixtures thereof are preferable.

It is a desirable embodiment to use an olefin-based thermoplastic copolymeric elastomer having a melt flow rate (MFR) of 0.2 to 5.0 g/10 min at 230° C. and a load of 2.16 kg, a density of 820 to 930 kg/m3, and a molecular weight distribution (Mw/Mn) of 1.3 to 6.0 determined by GPC. When the melt flow rate (MFR) at a load of 2.16 kg is less than 0.2 g/10 min, uniform kneading becomes insufficient, so that fish eyes are likely to occur. When the melt flow rate exceeds 5.0 g/min, it is not preferable from the viewpoint of bag breaking resistance.

(Propylene Homopolymer)

In the present invention, a propylene homopolymer can be used, whereby the tear strength is easily reduced and the transparency is easily improved. Examples of the propylene homopolymer include isotactic polypropylene, which has high crystallinity and is superior in rigidity and heat resistance, and atactic polypropylene, which has low crystallinity and superior flexibility. As the propylene homopolymer to be used, isotactic polypropylene, which has high crystallinity and is capable of suppressing deterioration of thermal shrinkage rate, is preferable.

The melt flow rate (MFR) (measured at 230° C. and load of 2.16 kg) of the propylene homopolymer is not particularly limited, but it is preferably 1 to 10 g/10 min, and more preferably 2 to 7. This is because when it is less than 1 g/10 min, the viscosity is excessively high and it is difficult to perform extrusion in a T-die, and conversely when it exceeds 10 g/10 min, problems such as stickiness of a film and poor impact resistance (impact strength) of a film occur.

(Additives)

The polyolefin-based resin composition in the present invention may contain an anti-blocking agent. Even one kind of an anti-blocking agent is effective, but when two or more kinds of inorganic particles having different particle diameters and figures are blended, complicated projections are formed in the irregularities on the film surface, so that a higher anti-blocking effect may be exerted in some cases.

The anti-blocking agent to be added is not particularly limited, and inorganic particles such as spherical silica, irregular silica, zeolite, talc, mica, alumina, hydrotalcite, and aluminum borate, and organic particles such as polymethyl methacrylate and ultrahigh molecular weight polyethylene can be added.

In the case of a multilayer configuration having two layers or three or more layers, the anti-blocking agent may be added to all the layers. If there are irregularities on the surface of a layer on which a biaxially oriented film is to be laminated, this may result in defective appearance in lamination. Therefore, it is preferable to add the anti-blocking agent to only a layer on which films are heat-sealed to each other.

The layer on which a biaxially oriented film is to be laminated is called a laminate layer and the surface thereof is called a laminate surface. A layer on which films are heat-sealed is called a seal layer, and the surface thereof is called a seal surface.

The amount of the anti-blocking agent to be added is preferably 3000 ppm or less, more preferably 2500 ppm or less with respect to the polyolefin-based resin composition of the layer to be added. By adjusting the amount of the anti-blocking agent to 3000 ppm or less, falling off of the anti-blocking agent can be reduced. An organic lubricant may be added to the polyolefin-based resin composition of the present invention. The lubricity and the anti-blocking effect of the laminated film are improved, so that the handleability of the film is improved. The reason for this is considered to be that the organic lubricant bleeds out and exists on the film surface, whereby a lubricant effect and a release effect are exhibited.

It is preferable to add an organic lubricant having a melting point of normal temperature or more. Examples of the organic lubricant include fatty acid amides and fatty acid esters.

Specific examples thereof include oleamide, erucamide, behenamide, ethylenebisoleamide, hexamethylenebisoleamide and ethylenebisoleamide. These may be used singly, but it is preferable to use two or more organic lubricants in combination because the lubricity and the anti-blocking effect can be maintained even in a severe environment.

As for the polyolefin-based resin composition of the present invention, an appropriate amount of an antioxidant, an antistatic agent, an antifogging agent, a neutralizing agent, a nucleating agent, a coloring agent, other additives, an inorganic filler, etc. may be blended in an arbitrary layer as necessary as long as the object of the present invention is not impaired.

For example, as an antioxidant, a phenol antioxidant and a phosphite antioxidant may be used in combination, or an antioxidant having a phenol-based skeleton and a phosphite-based skeleton in one molecule may be used alone. Examples of the neutralizing agent include calcium stearate.

(Polyolefin-Based Resin Composition)

The polyolefin-based resin composition in the present invention preferably comprises 0 to 2 parts by weight of a propylene-ethylene block copolymer based on 100 parts by weight of the propylene-α olefin random copolymer. Furthermore, the polyolefin-based resin composition more preferably comprises 0 to 1 part by weight of the propylene-ethylene block copolymer based on 100 parts by weight of the propylene-α olefin random copolymer. When the content of the propylene-ethylene block copolymer is adjusted to 2 parts by weight or less, transparency and low-temperature heat-sealability tend to be good.

The polyolefin-based resin composition in the present invention preferably comprises 0 to 2 parts by weight of an olefin-based thermoplastic copolymeric elastomer based on 100 parts by weight of the propylene-α olefin random copolymer.

Furthermore, the polyolefin-based resin composition more preferably comprises 0 to 1 part by weight of the olefin-based thermoplastic copolymeric elastomer based on 100 parts by weight of the propylene-α olefin random copolymer. When the content of the olefin-based thermoplastic copolymeric elastomer is adjusted to 2 parts by weight or less, a thermal shrinkage rate and transparency tend to be good.

The polyolefin-based resin composition in the present invention preferably comprises 0 to 40 parts by weight of a propylene homopolymer based on 100 parts by weight of the propylene-α olefin random copolymer. Furthermore, the polyolefin-based resin composition preferably comprises 0 to 25 parts by weight of the propylene homopolymer based on 100 parts by weight of the propylene-α olefin random copolymer. When the content of the propylene homopolymer is adjusted to 40 parts by weight or less, the low-temperature heat-sealability is easily obtained, and a heat-seal strength at a low temperature is easily obtained.

(Polyolefin-Based Resin Film)

The polyolefin-based resin film of the present invention may have a single layer, or may have multiple layers, i.e., two layers or three or more layers. In the case of a three-layer configuration, by adding pellets obtained by recycling a semi-product obtained in a production process or a product film after production to the intermediate layer, the cost can be reduced without impairing heat-seal energy and bag breaking resistance, or by adding a propylene-α olefin random copolymer having a low melting point only to the seal layer and using a propylene-α olefin random copolymer having a high melting point as a main component for the intermediate layer and the laminate layer, in other words, by using resins slightly differing in composition in respective layers, the effect can be further enhanced.

(Method for Producing Polyolefin-Based Resin Film)

As a method for forming the polyolefin-based resin film of the present invention, for example, an inflation method and a T-die method can be used, and the T-die method is preferred from the viewpoint of enhancing transparency or ease of drafting. The inflation method uses air as a cooling medium, whereas the T-die method uses a cooling roll and it therefore is a production method advantageous for increasing a cooling speed. By increasing the cooling rate, crystallization of an unstretched sheet can be suppressed, so that stretching by a roll is made advantageous in a subsequent step. For these reasons, the T-die method is preferable.

The lower limit of the temperature of a cooling roll on which a molten raw material is cast to afford a non-oriented sheet is preferably 15° C. and more preferably 20° C. When the temperature is less than the above, dew condensation may occur on the cooling roll, leading to insufficient adhesion. The upper limit of the cooling roll temperature is preferably 60° C. and more preferably 50° C. When the temperature exceeds the above, transparency may deteriorate.

A method for stretching a non-oriented sheet is not particularly limited, and for example, an inflation method, a tenter lateral stretching method, and a roll longitudinal stretching method can be used, and the roll longitudinal stretching method is preferable from the viewpoint of ease of controlling orientation.

The term "longitudinal stretching" as used herein means a direction in which a film flows from casting of a raw material resin composition to a step of winding a stretched film, and the term "lateral direction" means a direction perpendicular to the flow direction.

By stretching a non-oriented sheet, straight cuttability is exhibited. This is because the structure of molecular chains is regularly arranged in the stretching direction.

The lower limit of the stretch ratio is preferably 3.3 times. When the stretch ratio is smaller than this, the yield strength is reduced, so that the tear strength may be increased or the straight cuttability may be deteriorated. The stretch ratio is more preferably 3.5 times, and further preferably 3.8 times.

The upper limit of the stretch ratio is preferably 5.5 times. When the stretch ratio is larger than this, orientation excessively proceeds, a seal energy decreases, and bag breaking resistance after dropping may deteriorate. The stretch ratio is more preferably 5.0 times, and further preferably 4.7 times.

The lower limit of the stretching roll temperature is not particularly limited, and it is preferably 60° C. When the stretching roll temperature is lower than this, a stretch stress applied to the film increases, and the film may fluctuate in thickness. The lower limit of the stretching roll temperature is more preferably 70° C.

The upper limit of the stretching roll temperature is not particularly limited, and it is preferably 140° C. When the stretching roll temperature is higher than this, a stretch stress on the film may be decreased and thus not only a tearing strength of the film may be reduced but also the film may be welded to the stretching roll and the production of the film may be difficult. The upper limit of the stretching roll temperature is more preferably 130° C., further preferably 120° C., and particularly preferably 110° C.

It is preferable that the sheet temperature of the unstretched sheet has been raised by bringing the sheet into contact with a preheating roll prior to the introduction into the stretching step.

The lower limit of the preheating roll temperature in stretching a non-oriented sheet is not particularly limited, and it is preferably 70° C. and more preferably 80° C. If the preheating roll temperature is less than the above lower limit, there is a possibility that stretch stress increases, so that variation in thickness occurs. The upper limit of the preheating roll temperature is not particularly limited, and it is preferably 140° C., more preferably 130° C., and further preferably 120° C. When the preheating roll temperature is the above upper limit or more, the thermal shrinkage rate may increase. This is because thermal crystallization before stretching can be prevented to reduce a residual stress after stretching.

The polyolefin-based resin film subjected to the longitudinal stretching step is preferably subjected to annealing treatment in order to suppress thermal shrinkage. Examples of a method for the annealing treatment include a roll heating method and a tenter method, but the roll heating method is preferred from the viewpoint of simplicity of equipment and ease of maintenance. By performing the annealing treatment to reduce the internal stress of the film, thermal shrinkage of the film can be suppressed and the easy tearability can be further improved. Therefore, unlike a conventional method, heat-seal strength is less likely to be sacrificed in order to enhance the tearability as compared with the case where the stretch ratio is simply increased.

The lower limit of the annealing treatment temperature is not particularly limited, and it is preferably 80° C. When the annealing treatment temperature is less than the above value, the thermal shrinkage rate may increase, the tear strength may increase, or the finished quality of a packaging bag after bag production may deteriorate. The lower limit of the annealing treatment temperature is more preferably 90° C.

The upper limit of the annealing treatment temperature is not particularly limited, and it is preferably 125° C. When the annealing treatment temperature is higher, the thermal shrinkage rate is more likely to decrease, but when the annealing treatment temperature is higher than the upper limit, the heat-sealing strength may deteriorate or the film may be welded to production equipment. The upper limit of the annealing treatment temperature is more preferably 120° C., and particularly preferably 115° C.

In the annealing step, a relaxation step can be provided by reducing the rotation speed of the roll or sequentially reducing the conveyance speed of the film. By providing the relaxation step, the thermal shrinkage rate of the produced polyolefin-based resin film can be further reduced, and the heat-sealing strength can also be increased.

The upper limit of the relaxation rate in the relaxation step is preferably 10% and more preferably 8%. When the relaxation rate is 10% or less, the film under conveyance is less likely to sag, and winding in the process is less likely to occur. The lower limit of the relaxation rate is preferably 1% and more preferably 3%. When the relaxation rate is 1% or more, the thermal shrinkage rate of the polyolefin-based resin film is unlikely to increase.

In the present invention, it is preferable to activate the surface on the side where the polyolefin-based resin film described above and a biaxially oriented film made of another material are laminated by corona treatment or the like. Accordingly, the lamination strength with the base film is improved.

(Film Thickness)

The lower limit of the thickness of the polyolefin-based resin film of the present invention is preferably 7 μm, more preferably 10 μm, further preferably 12 μm, and particularly preferably 15 μm. When the thickness is 15μ or more, this is relatively large with respect to the thickness of the base film, so that the straight cuttability as a laminate is less likely to deteriorate, the stiffness of the film is obtained and it is easy to process the film, impact resistance is easily obtained, and bag breaking resistance is easily obtained. The upper limit of the film thickness is preferably 150 μm, more preferably 80 μm, and further preferably 50 μm. When the thickness is 150 μm or less, the stiffness of the film is not excessively strong and it is easy to process the film, and it is easy to produce a suitable package.

The characteristics of the polyolefin-based resin film will be described.

(Haze)

The lower limit of the haze of the polyolefin-based resin film of the present invention is preferably 1.0% and more preferably 2.0%. When the haze is 1.0% or more, the unevenness of the film surface is not extremely small, so that inner surface blocking of a package hardly occurs. The upper limit of the haze is preferably 20.0%, more preferably 15.0%, and further preferably 10.0%. When the haze is 20.0% or less, visibility of the package is easily obtained.

(Thermal Shrinkage Rate)

The polyolefin-based resin film of the present invention has an upper limit of a thermal shrinkage rate after heating at 120° C. for 30 minutes of 25% in a direction in which the thermal shrinkage rate after heating at 120° C. for 30 minutes is larger between a longitudinal direction and a lateral direction of the polyolefin-based resin film. If the thermal shrinkage rate exceeds the above upper limit, the tear strength increases, and at the same time, shrinkage at the time of heat-sealing becomes large, so that the appearance of a package may be impaired. The thermal shrinkage rate is preferably 20%, and more preferably 17%.

The polyolefin-based resin film of the present invention has a lower limit of a thermal shrinkage rate after heating at 120° C. for 30 minutes of 2% in a direction in which the thermal shrinkage rate after heating at 120° C. for 30 minutes is larger between a longitudinal direction and a lateral direction of the polyolefin-based resin film. An attempt to make the thermal shrinkage rate smaller than the lower limit may cause significant deterioration of the appearance because it is necessary to significantly increase the annealing temperature and the annealing time.

The polyolefin-based resin film of the present invention has an upper limit of a thermal shrinkage rate after heating at 120° C. for 30 minutes of 1% in a direction in which the thermal shrinkage rate after heating at 120° C. for 30 minutes is smaller between a longitudinal direction and a lateral direction of the polyolefin-based resin film. If the thermal shrinkage rate is 1% or less, the tear strength in the lateral direction increases, or the straight cuttability is poor. The upper limit of the thermal shrinkage rate is preferably 0.5%. The polyolefin-based resin film of the present invention has a lower limit of a thermal shrinkage rate after heating at 120° C. for 30 minutes of −5% in a direction in which the thermal shrinkage rate after heating at 120° C. for 30 minutes is smaller between a longitudinal direction and a lateral direction of the polyolefin-based resin film. When the thermal shrinkage rate is less than the lower limit, the film is less likely to stretch in the heat-sealing step, and the appearance of a package is less likely to deteriorate. The lower limit of a thermal shrinkage rate is preferably −3%.

(Piercing Strength)

The lower limit of the piercing strength per 1 μm of the polyolefin-based resin film of the present invention is preferably 0.12 N/μm and more preferably 0.14 N/μm. When the piercing strength is 0.12 N/μm or more, pinholes are less likely to be generated when a protrusion comes into contact with the package. The upper limit of the piercing strength is preferably 1.0 N/μm, more preferably 0.8 N/μm, and further preferably 0.5 N/μm. When the piercing strength is 1.0 inn/μm or less, the stiffness is not excessively strong, it becomes easy to handle the film or a laminate produced therefrom.

(Orientation Coefficient in Longitudinal Direction)

The orientation coefficient ΔNx in the longitudinal direction used in the present invention can be calculated from Formula 1.

$$\Delta Nx = Nx - [(Ny + Nz)/2] \quad \text{(Formula 1)}$$

Nx: refractive index in the longitudinal direction, Ny: refractive index in a direction perpendicular to the longitudinal direction, Nz: refractive index in the plane direction The lower limit of the orientation coefficient ΔNx in the longitudinal direction of the polyolefin-based resin film of the present invention is preferably 0.010, more preferably 0.015, and further preferably 0.020. When the orientation coefficient is 0.010 or more, the straight cuttability of a package is easily obtained. The upper limit of the orientation coefficient ΔNx in the longitudinal direction is preferably 0.0270 and more preferably 0.026. When the orientation coefficient is 0.0270 or less, the seal strength hardly decreases.

(Planar Orientation Coefficient)

The planar orientation coefficient ΔP used in the present invention can be calculated from a refractive index. The orientation coefficient in the plane direction can be calculated from Formula 2.

$$\Delta P = [(Nx + Ny)/2] - Nz \quad \text{(Formula 2)}$$

Nx: refractive index in the longitudinal direction, Ny: refractive index in a direction perpendicular to the longitudinal direction, Nz: refractive index in the plane direction The lower limit of the orientation coefficient ΔP in the plane direction of the polyolefin-based resin film of the present invention is preferably 0.0100 and more preferably 0.0120. When the planar orientation coefficient is 0.0100 or more, the piercing strength of a package is easily obtained. The upper limit of the planar orientation coefficient ΔP is preferably 0.0160, more preferably 0.0150, and further preferably 0.0140. When the planar orientation coefficient is 0.0160 or less, the seal strength hardly decreases.

(Melting Point of Film)

The lower limit of the melting point of the polyolefin-based resin film of the present invention is not particularly limited, and it is preferably 120° C., more preferably 130° C., and further preferably the melting point is 140° C. or more. When the melting point is 120° C. or more, heat resistance to heat-sealing is easily obtained. The upper limit of the melting point is preferably 150° C. and more preferably 145° C. When the melting point is 150° C. or less, low-temperature sealability is easily obtained.

(Bending Pinhole Resistance)

The flex resistance can be measured by Gelbo pinhole evaluation. The number of pinholes after the polyolefin-based resin film of the present invention is bent 1000 times at 1° C. is preferably 35, more preferably 30, further preferably 25, and particularly preferably 20. When the number of pinholes is 35 or less, pinholes are less likely to be formed by bending impact when the package is transported.

(Tear Strength)

The polyolefin-based resin film of the present invention preferably has an upper limit of a tear strength of 0.8 N in a direction in which the thermal shrinkage rate after heating at 120° C. for 30 minutes is larger between a longitudinal direction and a lateral direction of the polyolefin-based resin film. When the tear strength is 0.8 N or less, the laminate film is easily torn. The upper limit of the tear strength is more preferably 0.6 N, and particularly preferably 0.5 N.

The polyolefin-based resin film of the present invention preferably has a lower limit of a tear strength of 0.1 N in a direction in which the thermal shrinkage rate after heating at 120° C. for 30 minutes is larger between a longitudinal direction and a lateral direction of the polyolefin-based resin film. When the tear strength is 0.1 N or more, the bag breaking resistance is easily obtained. The lower limit of the tear strength is more preferably 0.3 N.

(Accelerated Blocking Strength)

The lower limit of the accelerated blocking strength of the polyolefin-based resin film of the present invention is preferably 20 mN/70 mm and more preferably 30 mN/70 mm. When the accelerated blocking strength is 20 mN/7 mm or more, the stiffness of the film is easily obtained. The upper limit of the accelerated blocking strength is preferably 100 mN/70 mm, more preferably 80 mN/70 mm, and further preferably 60 mN/70 mm. When the accelerated blocking strength is 100 mN/70 mm or less, blocking hardly occurs on the inner surface of a package.

(Martens Hardness)

The lower limit of the Martens hardness of at least one surface, particularly the sealing surface, of the polyolefin-based resin film of the present invention is preferably 80 N/mm$^2$, more preferably 90 N/mm$^2$, and particularly preferably the Martens hardness is 100 N/mm$^2$ or more. When the Martens hardness is 80 N/mm$^2$ or more, blocking hardly occurs on the inner surface of a package, and the lower limit of the Martens hardness is more preferably 90 N/70 mm$^2$. The upper limit of the Martens hardness is preferably 140 N/mm$^2$, more preferably 130 N/mm$^2$, and further preferably 120 N/mm$^2$. When the Martens hardness is 140 N/mm$^2$ or less, the film is not excessively hard, and bending pinhole resistance is easily obtained.

(Indentation Creep Rate)

The lower limit of the indentation creep rate (cit) of the seal surface of the polyolefin-based resin film of the present invention is preferably 1.8% and more preferably 2.0%. When the indentation creep rate is 1.8% or more, the film does not become hard, and bending pinhole resistance is easily obtained. The upper limit of the indentation creep rate (cit) is preferably 3.0% and more preferably 2.8%. When the indentation creep rate is 3.0% or less, blocking hardly occurs on the inner surface of a package.

(Wet Tension)

The lower limit of the wet tension of the surface of the polyolefin-based resin film of the present invention to be laminated on at least one base film selected from the group consisting of a polyamide resin film, a polyester resin film, and a polypropylene resin film is preferably 30 mN/m, and more preferably 35 mN/m. When the wet tension is 30 mN/m or more, the lamination strength hardly decreases. The upper limit of the wet tension is preferably 55 mN/m and more preferably 50 mN/m. When the wet tension is 55 mN/m or less, blocking between films hardly occurs when the polyolefin-based resin film is wound into a roll.

(Configuration and Production Method of Laminate)

The laminate including the polyolefin-based resin film of the present invention is a laminate including at least one film selected from the group consisting of a polyamide resin film, a polyester resin film, and a polypropylene resin film, and the polyolefin-based resin film used as a sealant. The laminate also may be configured by using a base film provided with coating or vapor deposition processing or by further laminating an aluminum foil as conventionally technologies in order to give an adhesive property and a barrier property.

Specific examples of the configuration include biaxially-stretched PET film/aluminum foil/sealant, biaxially-stretched PET film/biaxially-stretched nylon film/sealant, biaxially-stretched nylon film/sealant, biaxially-stretched polypropylene film/sealant, and biaxially-stretched PET film/biaxially-stretched nylon film/aluminum foil/sealant.

Among them, when a biaxially-stretched nylon film is laminated on a conventional sealant, the straight cuttability of a resulting laminate is significantly poor. When the polyolefin-based resin film of the present invention is used as a sealant, a laminate having superior straight cuttability can be produced whichever of the configuration is selected.

The lamination method to be used may be a conventional method such as a dry lamination method or an extrusion lamination method.

The characteristics of the laminate of the present invention will be described.

(Piercing Strength)

The lower limit of the piercing strength of the laminate of the present invention is preferably 10 N, more preferably 12 N, further preferably 14 N, and particularly preferably 16 N. When the piercing strength is 10 N or more, pinholes are less likely to be generated when a protrusion comes into contact with the package. The upper limit of the piercing strength is preferably 45 N, more preferably 30 N, and further preferably 25 N. When the piercing strength is 45 N or less, the stiffness of the laminate is not excessively strong and it becomes easy to handle the laminate.

(Straight Cuttability)

The upper limit of the straight cuttability of the laminate of the present invention is preferably 8 mm, more preferably 7 mm, further preferably 6 mm, and particularly preferably 3 mm. When the straight cuttability is 8 mm or less, a package is resistant to parting.

(Parting)

The upper limit of the parting of the laminate of the present invention is preferably 12 mm, more preferably 10 mm, further preferably 6 mm, and particularly preferably 4 mm. When the parting is 12 mm or less, the contents are hardly spilled when the package is torn.

(Heat-Seal Strength)

The lower limit of the heat-seal strength of the laminate of the present invention before retorting is preferably 18 N/15 mm, more preferably 19 N/15 mm, and further preferably 20 N/15 mm. When the heat-seal strength is 20 N/15 mm or more, bag breaking resistance is easily obtained. A heat-seal strength of 60 N/15 mm is sufficient.

The upper limit of the heat-seal strength per 1 μm is preferably 3.0 N/15 mm·μm, and more preferably 2.0 N/15 mm·μm. When the heat-seal strength per 1 μm is 3.0 N/15 mm·μm or less, an additive such as a resin having high impact resistance or a filler is not required, and the cost is hardly increased. The lower limit of the heat-seal strength per 1 μm is not particularly limited, and it is preferably 0.9 N/15 mm·μm, more preferably 0.95 N/15 mm·μm, and further preferably 1.0 N/15 mm·μm. When the heat-seal strength per 1 μm is 0.9 N/15 mm·μm or more, the seal is hardly peeled off during transportation, and the contents hardly leak.

(Package)

The laminate provided to enclose contents such as foodstuffs to protect the contents from dirt or gas derived from nature is referred to as a package. The package is produced by, for example, cutting the laminate described above and bonding inner surfaces of the laminate to each other by a hot heat-seal bar or ultrasonic waves to form a bag. For example, a four-side sealed bag is widely used which is produced by stacking two rectangular sheets of the laminate in such a manner that their sealant-side surfaces face to each other and heat-sealing four sides. The contents may be foodstuffs, or may be other products such as daily goods, and the shape of the package may be a shape other than a rectangular shape such as a standing pouch or a pillow package.

EXAMPLES

Hereinafter, the present invention will be described in detail with reference to Examples, but the present invention is not limited thereto. The characteristics obtained in the Examples were measured and evaluated by the following methods. In the evaluation, the flow direction of the film in the film formation step was defined as the longitudinal direction, and the direction perpendicular to the flow direction was defined as the lateral direction.

(1) Resin Density

The density was evaluated according to the D method (density gradient tube method) of JIS K7112:1999. Measurement was performed at N=3, and the average value was calculated.

(2) Melt Flow Rate (MFR)

Measurement was performed at 230° C. under a load of 2.16 kg according to JIS K-7210-1. The measurement was performed at N=3, and the average value was calculated.

(3) Haze

The haze was measured according to JIS K 7136. For a polyolefin-based resin film before lamination, the measurement was performed at N=3, and the average value was calculated.

(4) Tear Strength

A strip sample having a longitudinal direction length of 150 mm and a direction length perpendicular to the longitudinal direction of 60 mm was cut out from the film and the laminate. An incision of 30 mm was made from the center of one short side of the sample along the longitudinal direction. The sample was conditioned in an atmosphere of a temperature of 23° C. and a relative humidity of 50%, and then the measurement was performed.

The ranges 10 mm away from the right and left short sides of the cut sample were gripped with grippers, respectively, and the grippers were attached to an Autograph AG-I manufactured by Shimadzu Corporation with the distance between the two grippers adjusted to 40 mm, and the grippers were carefully tightened such that the long side of the sample became parallel to a virtual center line between the two grippers.

The test speed was adjusted to 200 mm/min, and the testing machine was started. The tear strength was measured until the cut reached the other short side of the sample, and the average value of the tear strengths at the cut points of 25 mm, 50 mm, 75 mm and 100 mm was calculated.

With the inner surface of the wound film placed forward, the measurement was performed at N=3 for both when the section on the right side was gripped with the upper gripper and when the section on the left side was gripped with the upper gripper, and the average values were calculated for both the cases, respectively. The larger value among the measurement results of the right side and the left side was adopted as a tear strength.

Similarly, with the polyolefin-based resin film of the laminate placed forward, the measurement was performed at N=3 for both when the section on the right side was gripped with the upper gripper and when the section on the left side was gripped with the upper gripper, and the average values were calculated for both the cases, respectively. The larger value among the measurement results of the right side and the left side was adopted as a tear strength.

(5) Piercing Strength

The piercing strength of a polyolefin-based resin film and a laminate was measured at 23° C. in accordance with "2. Strength test method" of "Specifications and Standards for Food, Food Additives, etc. III: Apparatus and containers and packaging" (Ministry of Health and Welfare Notification No. 20, 1982) in Food Sanitation Act. The film was pierced with a needle having a tip diameter of 0.7 mm at a piercing speed of 50 mm/min, and the strength when the needle penetrated the film was measured. The measured value was divided by the thickness of the film, and a piercing strength per 1 μm of the film [N/μm] was thereby calculated. The measurement was performed at N=3, and the average value was calculated.

(6) Orientation Coefficient in Longitudinal Direction and Planar Orientation Coefficient The density was evaluated in accordance with the test methods for refractive index of chemical products of JIS K 0062: 1999. The measurement was performed at N=3, and the average value was calculated. The orientation coefficient ΔNx in the longitudinal direction was calculated by Formula 1, and the orientation coefficient ΔP in the planar direction was calculated by Formula 2.

$$\Delta Nx = Nx - [(Ny+Nz)/2] \quad \text{(Formula 1)}$$

$$\Delta P = [(Nx+Ny)/2] - Nz \quad \text{(Formula 2)}$$

(7) Melting Point

The temperature of the maximum melting peak of the DSC curve of a polyolefin-based resin film produced using Shimadzu Differential Scanning calorimeter DSC-60 manufactured by Shimadzu Corporation was defined as a melting point. The starting temperature was 30° C., the temperature raising rate was 5° C./min, and the ending temperature was 180° C. The measurement was performed at N=3, and the average value was calculated.

(8) Bending Pinhole Resistance

A laminate with a polyolefin-based resin film laminated was cut out into a size of 280 mm in the longitudinal direction and 260 mm in the lateral direction. The laminate was formed into a cylindrical shape having a diameter of 89 mm and a height of 260 mm with the polyolefin-based resin film facing inward, and the laminate was then fixed with a cellophane tape. The sample was attached to a Gelbo Flex Tester with a chamber manufactured by Tester Sangyo Co., Ltd., and a bending load of 1° C., 1000 times was applied. The sample was removed and the number of pinholes was counted. The measurement was performed at N=3, and the average value was calculated.

(9) Thermal Shrinkage Rate

A film before lamination was cut into a 120 mm square. Gauge lines were drawn at an interval of 100 mm in each of the longitudinal direction and the lateral direction. The sample was suspended in an oven maintained at 120° C., and was subjected to heat treatment for 30 minutes. A distance between the gauge lines was measured, and a thermal shrinkage rate was calculated according to the following formula. The measurement was performed at N=3, and the average value was calculated.

Thermal shrinkage rate=(gauge length before heat treatment−gauge length after heat treatment)/gauge length before heat treatment×100(%)   (Formula 3)

(10) Accelerated Blocking Strength

A polyolefin-based resin film was cut out into a size of 148 mm in the longitudinal direction and 105 mm in the lateral direction. The polyolefin-based resin film was superposed with its seal surfaces facing each other. The polyolefin-based resin film was preheated in an environment of 50° C. for 30 minutes, and then sandwiched between 7.0 cm square aluminum plates held at 50° C. The aluminum plates and the sample were pressed under conditions of 50° C. and 100 kN using a Mini-Test Press MP-SCH manufactured by Toyo Seiki Seisaku-sho, Ltd., and were held for 15 minutes. The sample taken out was cut into 70 mm long in a lateral direction. The superposed sample was opened by 30 mm, and a metal rod having a diameter of 3 mm was inserted so as to be parallel to the lateral direction. The sample was mounted on an Autograph AG-I manufactured by Shimadzu Corporation, and the weight when the metal rod was moved under the condition of 200 mm/min in the longitudinal direction was measured. The measurement was performed at N=3, and the average value was calculated.

(11) Martens Hardness, Indentation Creep Rate

A polyolefin-based resin film was cut into a 10 mm square, placed on a cover glass to which an adhesive had been applied with the measurement surface facing upward, and dried for 24 hours. Martens hardness and an indentation creep rate were measured using a Shimadzu Dynamic Ultra Micro Hardness Tester DUH-211 manufactured by Shimadzu Corporation. The measurement mode was a loading-unloading test, a test force of 0.5 mN, a loading speed of 6.0 mN/sec, and a load holding time of 2 sec, and a Triangular 15 was used as an indenter. The measurement was performed at N=10, and the average value was calculated.

(12) Straight Cuttability

Straight cuttability refers to performance of a laminate of tearing straight in parallel to one direction when the laminate is torn. The measurement was performed by the following method. In Examples and Comparative Examples, since straight cuttability in a stretching direction is exhibited, measurement in the stretching direction was performed.

A laminate was cut into a strip of 150 mm in the stretching direction and 60 mm in the direction perpendicular to the stretching direction, and an incision of 30 mm was made along the measurement direction from the center of a short side. The sample was torn according to JIS K 7128-1: 1998. When the laminate was torn 120 mm, excluding 30 mm of the incision, in the stretching direction, the distance moved in the direction perpendicular to the stretching direction was measured, and the absolute value thereof was recorded. The measurement was performed at N=3 for both when the section on the right side was gripped with the upper gripper and when the section on the left side was gripped with the upper gripper, and the average values were calculated for both the cases, respectively. The larger value among the measurement results of the right side and the left side was adopted.

(13) Parting

The heat-seal films of two laminates were faced with each other and heat-sealed to prepare a four-side sealed bag having an inside dimension of 120 mm in the longitudinal direction and 170 mm in the width direction. A notch was formed at an edge of the four-side sealed bag, and the bag was torn with fingers in the stretching direction. The bag was cut to the opposite edge, and a gap between the tear lines of the front-side film and the back-side film of the bag was measured. The measurement was performed at N=3 in each of a direction in which the right-hand side was toward the front and a direction in which the left-hand side was toward the front, and average values were calculated, respectively. The larger one of the measured values was adopted.

(14) Finished Quality of Bag

The polyolefin-based resin film sides of laminates were superimposed on each other, and then heat-sealed at a pressure of 0.2 MPa and a heat-seal temperature of 220° C. for 1 second using a seal bar having a width of 10 mm to form a four-side sealed bag having inside dimensions of 120 mm in the longitudinal direction and 170 mm in the lateral direction. The finished condition of the four-side sealed bag was visually checked.

○: There was no distortion in the vicinity of the heat-sealed portions, and the bag was perfectly rectangular.

Δ: There was a little distortion in the vicinity of the heat-sealed portions.

x: There was a large distortion in the vicinity of the heat-sealed portions, and the edges of the bag were wavy.

(15) Heat-Seal Strength

The heat-seal conditions and the strength measurement conditions are as follows. The polyolefin-based resin film sides of laminates obtained in an example or a comparative example were superimposed on each other, then heat-sealed at a pressure of 0.2 MPa and a heat-seal temperature of 220° C. for 1 second using a seal bar having a width of 10 mm, and then allowed to cool. Test pieces having a size of 80 mm in the longitudinal direction and 15 mm in the lateral direction were cut out from each of the films heat-sealed at different temperatures, and the heat-sealed portion of each of the test pieces was peeled at a cross head speed of 200 mm/min to measure peel strength. As a testing machine, a universal material testing machine 5965 manufactured by Instron was used. The measurement was performed at N=3 times, and the average value was calculated.

(16) Orientation Angle

The orientation angle (°) of a base film was measured using a molecular orientation analyzer MOA-6004 manufactured by Oji Scientific Instruments Co., Ltd. A sample having a size of 120 mm in the longitudinal direction and 100 mm in the lateral direction was cut out and mounted to the measuring instrument, and a measured value of angle was defined as an orientation angle. It is to be noted that the longitudinal direction is 0°. The measurement was performed at N=3, and the average value was calculated.

Example 1

(Polyolefin-Based Resin Film)

For the polypropylene-based resin films of Examples 1 to 4 and Comparative Examples 1 to 8, raw materials were arranged on the basis of the resin compositions and the ratios thereof of respective layers shown in Tables 1 and 2 described later. As shown in Tables 1 and 2, while the amount of the arranged material of each layer was set to 100 parts by weight, behenamide was added as an organic lubricant to the heat-seal layer to a content of 260 ppm and to the intermediate layer to a content of 260 ppm and silica having an average particle diameter of 4 μm was added as an inorganic anti-blocking agent to the heat-seal layer to a content of 2000 ppm. These raw materials were homogeneously mixed to afford a mixed raw material for producing a polyolefin-based resin film.

(Raw Materials Used)

Raw material A: Propylene-ethylene-butene random copolymer FL8115A (MFR: 7.0 g/10 min, melting point: 148° C.) manufactured by Sumitomo Chemical Co., Ltd.

Raw material B: Propylene-ethylene random copolymer F-724NPC (MFR: 7.0 g/10 min, melting point: 149° C.) manufactured by Prime Polymer Co., Ltd.

Raw material C: Butene-ethylene random copolymer (melting point: 120° C., ethylene content: 4.0 parts by weight)

Raw material D: Propylene-ethylene block copolymer WFS5293-22 (resin density: 891 kg/m3, 230° C., MFR 3.0 g/10 min) manufactured by Sumitomo Chemical Co., Ltd.

Raw material E: Isotactic polypropylene FLX80E4 (MFR: 7.5 g/min, melting point: 164° C.) manufactured by Sumitomo Chemical Co., Ltd.

Raw material F: Atactic polypropylene SUNATAC manufactured by Chiba Fine Chemicals Co., Ltd.

Raw material G: Ethylene-butene copolymeric elastomer resin TAFMER A-4085S (MFR at 190° C. and 2.16 kg: 1.4 g/10 min) manufactured by Mitsui Chemicals, Inc.

Raw material H: Propylene-butene copolymeric elastomer resin TAFMER XM-7070S (MFR at 190° C. and 2.16 kg: 3.0 g/10 min) manufactured by Mitsui Chemicals, Inc.

Raw material I: Linear low-density polyethylene Evolue SP1520 (MFR: 2.0 g/10 min, density: 0.913 g/cm$^3$) manufactured by Prime Polymer Co., Ltd.

Raw material J: Propylene-ethylene-butene random copolymer FL8115A (MFR: 6.0 g/10 min, melting point: 130° C.) manufactured by Sumitomo Chemical Co., Ltd.

(Melt Extrusion)

The mixed raw material to be used for the intermediate layer, the mixed raw material for the laminate layer, and the mixed raw material for the heat-seal layer were introduced by using a three-stage single screw extruder having a screw diameter of 90 mm, a three-stage single screw extruder having a diameter of 45 mm, and a three-stage single screw extruder having a diameter of 65 mm, respectively into a T slot die having a two-stage preland 800 mm in width and designed so as to make a flow in the die uniform by curving the stepped portion to allow a molten resin to flow uniformly, in the order of the laminate layer/the intermediate layer/the heat-seal layer. The mixed raw materials were then extruded through the die at an outlet temperature of 230° C. The thickness proportions of the laminate layer/the intermediate layer/the heat-seal layer were 25%/50%/25%, respectively.

(Cooling)

The molten resin sheet discharged from the die was cooled with a cooling roll at 21° C. to afford an unstretched polyolefin-based resin film having a thickness of 70 μm. At the time of cooling with the cooling roll, both edges of the film on the cooling roll were fixed with air nozzles, the entire width of the molten resin sheet was pressed against the cooling roll with an air knife, and at the same time, a vacuum chamber was operated to prevent air from being entrained between the molten resin sheet and the cooling roll. The air nozzles were installed in series in the direction of forward movement of the film at both the edges. The die was surrounded by a sheet to prevent air from blowing the molten resin sheet.

(Preheating)

The unstretched sheet was led to heated rolls, and the sheet was preheated by bringing the sheet into contact with the rolls. The temperature of the preheating rolls was 80° C. Multiple rolls were used to preheat both sides of the film.

(Longitudinal Stretching)

The unstretched sheet was led to a longitudinal stretching machine, and stretched 3.5 times using a roll speed difference to have a thickness of 20 μm. The temperature of the stretching roll was 80° C.

(Annealing Treatment)

Heat treatment was performed at 100° C. with addition of a 5% relaxation ratio using annealing rolls. Multiple rolls were used to heat-treat both sides of the film.

(Corona Treatment)

One surface (the laminate surface) of the film was subjected to corona treatment.

(Winding)

The film was produced at a speed of 20 m/min. The film produced was trimmed at its crust portions and then wound into a roll. The wet tension of the one surface (the laminate surface) of the film was 42 mN/m.

(Preparation of Laminate)

An ester-based adhesive prepared by mixing 33.6 parts by mass of a main agent (TM569 manufactured by Toyo-Morton, Ltd.), 4.0 parts by mass of a curing agent (CAT10L manufactured by Toyo-Morton, Ltd.) and 62.4 parts by mass of ethyl acetate was applied to a biaxially stretched nylon film manufactured by Toyobo Co., Ltd. (N1102, thickness: 15 μm, orientation angle: 22° with respect to the longitudinal direction) as a base film in an applied amount of 3.0 g/m2, and the obtained polyolefin-based resin film and the base film were dry-laminated. The wound product was kept at 40° C. and aged for 3 days to afford a laminate.

Example 2, Example 4, and Example 5

A 20 μm-thick polyolefin-based resin film of was prepared in the same manner as in Example 1 except that the raw materials shown in Table 1 were used, the thickness of the unstretched polyolefin-based resin film was 80 μm, and the longitudinal stretch ratio was 4.0 times. A laminate was prepared in the same manner as in Example 1.

Example 3

A 20 μm thick polyolefin-based resin film of was prepared in the same manner as in Example 1 except that the raw materials shown in Table 1 were used, the thickness of the unstretched polyolefin-based resin film was 90 μm, and the longitudinal stretch ratio was 4.5 times. A laminate was prepared in the same manner as in Example 1.

Comparative Example 1

A 60 μm-thick polyolefin-based resin film was prepared in the same manner as in Example 1 except that the anti-blocking agent was not added, the raw materials shown in Table 2 were used, the thickness of the unstretched polyolefin-based resin film was 270 μm, the temperature of the preheating roll was 105° C., the stretching roll temperature was 105° C., the longitudinal stretch ratio was 4.5 times, and the temperature of the annealing treatment was 120° C. A laminate was prepared in the same manner as in Example 1.

Comparative Example 2

A 90 μm-thick polyolefin-based resin film was prepared in the same manner as in Example 2 except that the raw materials shown in Table 2 were used and the annealing treatment was not performed. A laminate was prepared in the same manner as in Example 1.

Comparative Example 3

A 25 μm-thick polyolefin-based resin film was prepared in the same manner as in Example 2 except that the raw materials shown in Table 2 were used without adding the anti-blocking agent, the thickness of the unstretched polyolefin-based resin film was 100 μm, the preheating roll temperature was 102° C., the stretching roll temperature was 102° C., and the annealing treatment temperature was 135° C. A laminate was prepared in the same manner as in Example 1.

Comparative Example 4

A 40 μm-thick polyolefin-based resin film was prepared in the same manner as in Example 2 except that the anti-blocking agent in the heat-seal layer was set to 3000 ppm, the raw materials shown in Table 2 were used, the thickness of the unstretched polyolefin-based resin film was set to 320 μm, the film was transversely stretched 8.0 times at a preheating temperature of 135° C. and a stretching temperature of 165° C. by a tenter method without performing longitudinal stretching, and the film was subjected to annealing treatment with hot air at 155° C. in the tenter. A laminate was prepared in the same manner as in Example 1.

Comparative Example 5

A 36 μm-thick polyolefin-based resin film was prepared in the same manner as in Example 2 except that the anti-blocking agent in the heat-seal layer was set to 2400 ppm, the raw materials shown in Table 2 were used, the thickness ratio of the laminate layer/the intermediate layer/the heat-seal layer was set to 2/5/29, the thickness of the unstretched polyolefin-based resin film was set to 180 μm, the longitudinal stretch ratio was set to 5.0 times, and the annealing treatment was not performed. A laminate was prepared in the same manner as in Example 1.

Comparative Example 6

A 60 μm-thick polyolefin-based resin film was prepared in the same manner as in Comparative Example 1 except that the anti-blocking agent in the heat-seal layer was set to 2400 ppm, the raw materials shown in Table 2 were used, the thickness ratio of the laminate layer/the intermediate layer/the heat-seal layer was set to 17/33/10, the thickness of the unstretched polyolefin-based resin film was set to 258 μm, the stretch ratio was set to 4.3 times, and the annealing treatment was not performed. A laminate was prepared in the same manner as in Example 1.

Comparative Example 7

A 20 μm-thick polyolefin-based resin film of was prepared in the same manner as in Example 2 except that the anti-blocking agent in the heat-seal layer was set to 3000 ppm, the raw materials shown in Table 2 were used, the thickness of the unstretched polyolefin-based resin film was 100 μm, and the longitudinal stretch ratio was 5.0 times. A laminate was prepared in the same manner as in Example 1.

Comparative Example 8

A 20 μm-thick polyolefin-based resin film was formed in the same manner as in Example 2 except that the annealing roll temperature was 130° C.

In Comparative Example 1, the product was poor in transparency (haze) due to the use of the block copolymer as a main component.

In Comparative Example 2, Comparative Example 5, and Comparative Example 6, the products exhibited high thermal shrinkage rates and were poor in finished quality of bags.

In Comparative Example 3, the product had a high melting point and was poor in low-temperature sealability due to the use of the propylene homopolymer in the large amount.

In Comparative Example 4, the product had a small planar orientation coefficient and was poor in piercing strength because the stretching direction was transverse stretching.

In Comparative Example 7, the product was poor in straight cuttability and parting due to the use of the butene-ethylene random copolymer having a low melting point.

In Comparative Example 8, the product was poor in heat-seal strength due to the increased annealing temperature.

The results described above are shown in Tables 1 and 2.

TABLE 1

| | | | Example 1 | Example 2 | Example 3 |
|---|---|---|---|---|---|
| Laminate layer | Propylene-ethylene-butene random | Raw material A | 100 | 100 | 100 |
| Intermediate layer | Propylene-ethylene random | Raw material B | — | — | — |
| | Butene-ethylene random | Raw material C | — | — | — |
| | Propylene-ethylene block | Raw material D | — | — | — |
| | Isotactic PP | Raw material E | — | — | — |
| | Atactic PP | Raw material F | — | — | — |
| | Ethylene-butene copolymeric elastomer | Raw material G | — | — | — |
| | Propylene-butene copolymeric elastomer | Raw material H | — | — | — |
| | Linear low-density polyethylene | Raw material I | — | — | — |
| Heat-seal layer | Propylene-ethylene-butene random | Raw material J | 100 | 100 | 100 |
| | Propylene-ethylene random | Raw material B | — | — | — |
| | Butene-ethylene random | Raw material C | — | — | — |
| | Propylene-ethylene block | Raw material D | — | — | — |
| | Isotactic PP | Raw material E | — | — | — |
| | Atactic PP | Raw material F | — | — | — |
| | Ethylene-butene copolymeric elastomer | Raw material G | — | — | — |
| | Propylene-butene copolymeric elastomer | Raw material H | — | — | — |
| | Linear low-density polyethylene | Raw material I | — | — | — |
| | Anti-blocking agent | ppm | 2000 | 2000 | 2000 |
| | Anti-blocking agent Particle diameter | μm | Silica 4.0 μm | Silica 4.0 μm | Silica 4.0 μm |
| Thickness | Laminate layer | μm | 5 | 5 | 5 |
| | Intermediate layer | μm | 10 | 10 | 10 |
| | Heat-seal layer | μm | 5 | 5 | 5 |
| | Total | μm | 20 | 20 | 20 |
| | Preheating temperature | °C. | 80 | 80 | 80 |
| | Stretching temperature | °C. | 80 | 80 | 80 |
| | Stretching direction | — | Longitudinal | Longitudinal | Longitudinal |
| | Stetch ratio | time | 3.5 | 4.0 | 4.5 |
| | Annealing treatment | °C. | 100 | 100 | 100 |
| | Haze | % | 2.5 | 2.3 | 2.3 |
| Friction coefficient | Non-treated surfaces | — | 0.13 | 0.13 | 0.13 |
| Tear strength | Longitudinal direction | N | 0.57 | 0.55 | 0.48 |
| Tear strength | Lateral direction | N | unmeasurable* | unmeasurable* | unmeasurable* |
| | Piercing strength | N | 2.9 | 2.9 | 3.2 |
| Piercing strength | Per 1 μm | N/μm | 0.14 | 0.15 | 0.16 |
| Accelerated blocking | Longitudinal direction | mN/70 mm | 45 | 45 | 40 |
| Martens hardness | Heat sealing surface | N/mm2 | 107 | 110 | 115 |
| Indentation creep rate (cit) | Heat sealing surface | % | 2.3 | 2.3 | 2.1 |
| X axis orientation | ΔNx | — | 0.0224 | 0.0258 | 0.0265 |
| Planar orientation | ΔP | — | 0.0135 | 0.0137 | 0.0140 |
| Melting point | Melting point | °C. | 133 | 134 | 134 |
| Gelbo pinhole | 1° C. 1000 times | Number | 26 | 24 | 18 |
| Thermal shrinkage rate | Longitudinal direction | % | 9.5 | 11.8 | 12.6 |
| 120° C. 30 min | Lateral direction | % | −0.1 | −0.8 | −0.9 |
| Wet tension | Corona treated surface | mN/m | 42 | 42 | 42 |
| Finished quality of bag ※ — | | — | ○ | ○ | ○ |
| Seal strength ※ | Longitudinal direction | N/15 mm | 22 | 22 | 21 |
| | Piercing strength ※ | N | 16.5 | 16.8 | 16.9 |
| Tear strength ※ | Longitudinal direction | N | 0.30 | 0.28 | 0.24 |
| Tear strength ※ | Lateral direction | N | unmeasurable* | unmeasurable* | unmeasurable* |
| Straight cuttability ※ | Stretching direction | mm | 4 | 2 | 1 |
| Parting ※ | Stretching direction | mm | 8 | 3 | 2 |

TABLE 1-continued

|  |  |  |  | Example 4 | Example 5 |
|---|---|---|---|---|---|
| Laminate layer | Propylene-ethylene-butene random | Raw material A | | — | 100 |
| Intermediate layer | Propylene-ethylene random | Raw material B | | 100 | — |
| | Butene-ethylene random | Raw material C | | — | — |
| | Propylene-ethylene block | Raw material D | | — | — |
| | Isotactic PP | Raw material E | | — | 20 |
| | Atactic PP | Raw material F | | — | — |
| | Ethylene-butene copolymeric elastomer | Raw material G | | — | — |
| | Propylene-butene copolymeric elastomer | Raw material H | | — | — |
| | Linear low-density polyethylene | Raw material I | | — | — |
| Heat-seal layer | Propylene-ethylene-butene random | Raw material J | | 100 | 100 |
| | Propylene-ethylene random | Raw material B | | — | — |
| | Butene-ethylene random | Raw material C | | — | — |
| | Propylene-ethylene block | Raw material D | | — | — |
| | Isotactic PP | Raw material E | | — | 20 |
| | Atactic PP | Raw material F | | — | — |
| | Ethylene-butene copolymeric elastomer | Raw material G | | — | — |
| | Propylene-butene copolymeric elastomer | Raw material H | | — | — |
| | Linear low-density polyethylene | Raw material I | | — | — |
| | Anti-blocking agent | | ppm | 2000 | 2000 |
| | Anti-blocking agent Particle diameter | | μm | Silica 4.0 μm | Silica 4.0 μm |
| Thickness | Laminate layer | | μm | 5 | 5 |
| | Intermediate layer | | μm | 10 | 10 |
| | Heat-seal layer | | μm | 5 | 5 |
| | Total | | μm | 20 | 20 |
| | Preheating temperature | | °C. | 80 | 80 |
| | Stretching temperature | | °C. | 80 | 80 |
| | Stretching direction | | — | Longitudinal | Longitudinal |
| | Stetch ratio | | time | 4.0 | 4.0 |
| | Annealing treatment | | °C. | 100 | 100 |
| | Haze | | % | 2.3 | 2.1 |
| Friction coefficient | Non-treated surfaces | | — | 0.13 | 0.12 |
| Tear strength | Longitudinal direction | | N | 0.54 | 0.45 |
| Tear strength | Lateral direction | | N | unmeasurable* | unmeasurable* |
| | Piercing strength | | N | 3.0 | 3.2 |
| Piercing strength | Per 1 μm | | N/μm | 0.15 | 0.16 |
| Accelerated blocking | Longitudinal direction | | mN/70 mm | 43 | 42 |
| Martens hardness | Heat sealing surface | | N/mm2 | 111 | 114 |
| Indentation creep rate (cit) | Heat sealing surface | | % | 2.3 | 2.4 |
| X axis orientation | ΔNx | | — | 0.0260 | 0.0261 |
| Planar orientation | ΔP | | — | 0.0134 | 0.1410 |
| Melting point | Melting point | | °C. | 134 | 139 |
| Gelbo pinhole | 1° C. 1000 times | | Number | 24 | 19 |
| Thermal shrinkage rate | Longitudinal direction | | % | 11.6 | 9.6 |
| 120° C. 30 min | Lateral direction | | % | −0.7 | −0.1 |
| Wet tension | Corona treated surface | | mN/m | 42 | 42 |
| Finished quality of bag ※ | — | | — | ○ | ○ |
| Seal strength ※ | Longitudinal direction | | N/15 mm | 22 | 20 |
| | Piercing strength ※ | | N | 16.8 | 16.9 |
| Tear strength ※ | Longitudinal direction | | N | 0.29 | 0.26 |
| Tear strength ※ | Lateral direction | | N | unmeasurable* | unmeasurable* |
| Straight cuttability ※ | Stretching direction | | mm | 1 | 1 |
| Parting ※ | Stretching direction | | mm | 2 | 2 |

TABLE 2

|  |  |  | Comparative Example 1 | Comparative Example 2 | Comparative Example 3 |
|---|---|---|---|---|---|
| Laminate layer | Propylene-ethylene-butene random | Raw material A | — | 100 | — |
| Intermediate layer | Propylene-ethylene random | Raw material B | — | — | 100 |
| | Butene-ethylene random | Raw material C | — | — | — |
| | Propylene-ethylene block | Raw material D | 100 | — | — |
| | Isotactic PP | Raw material E | — | — | 100 |
| | Atactic PP | Raw material F | — | — | 50 |
| | Ethylene-butene copolymeric elastomer | Raw material G | 4 | — | — |
| | Propylene-butene copolymeric elastomer | Raw material H | 4 | — | — |
| | Linear low-density polyethylene | Raw material I | — | — | — |
| Heat-seal layer | Propylene-ethylene-butene random | Raw material J | — | 100 | — |
| | Propylene-ethylene random | Raw material B | — | — | 100 |
| | Butene-ethylene random | Raw material C | — | — | — |
| | Propylene-ethylene block | Raw material D | 100 | — | — |
| | Isotactic PP | Raw material E | — | — | 100 |
| | Atactic PP | Raw material F | — | — | 50 |

TABLE 2-continued

|  |  |  |  |  |  |
|---|---|---|---|---|---|
|  | Ethylene-butene copolymeric elastomer | Raw material G | 4 | — | — |
|  | Propylene-butene copolymeric elastomer | Raw material H | 4 | — | — |
|  | Linear low-density polyethylene | Raw material I | — | — | 50 |
|  | Anti-blocking agent | ppm | 0 | 2000 | 0 |
|  | Anti-blocking agent Particle diameter | μm | — | Silica 4.0 μm | — |
| Thickness | Laminate layer | μm | 15 | 5 | 6 |
|  | Intermediate layer | μm | 30 | 10 | 12 |
|  | Heat-seal layer | μm | 15 | 5 | 6 |
|  | Total | μm | 60 | 20 | 25 |
|  | Preheating temperature | ° C. | 105 | 80 | 102 |
|  | Stretching temperature | ° C. | 105 | 80 | 102 |
|  | Stretching direction | — | Longitudinal | Longitudinal | Longitudinal |
|  | Stetch ratio | time | 4.5 | 4.0 | 4.0 |
|  | Annealing treatment | ° C. | 120 | No | 135 |
|  | Haze | % | 67.0 | 2.2 | 2.4 |
| Friction coefficient | Non-treated surfaces | — | 0.64 | 0.13 | 0.96 |
| Tear strength | Longitudinal direction | N | 0.13 | 0.55 | 0.58 |
| Tear strength | Lateral direction | N | unmeasurable* | unmeasurable* | unmeasurable* |
|  | Piercing strength | N | 10.5 | 3.0 | 3.6 |
| Piercing strength | Per 1 μm | N/μm | 0.18 | 0.15 | 0.14 |
| Accelerated blocking | Longitudinal direction | mN/70 mm | 1430 | 72 | 1540 |
| Martens hardness | Heat sealing surface | N/mm2 | 49 | 106 | 111 |
| Indentation creep rate (cit) | Heat sealing surface | % | 2.4 | 2.1 | 2.1 |
| X axis orientation | ΔNx | — | 0.0234 | 0.0255 | 0.0260 |
| Planar orientation | ΔP | — | 0.0124 | 0.0137 | 0.0136 |
|  | Melting point | ° C. | 166 | 133 | 158 |
| Gelbo pinhole | 1° C. 1000 times | Number | 0 | 22 | 22 |
| Thermal shrinkage rate | Longitudinal direction | % | 8.8 | 31.1 | 8.2 |
| 120° C. 30 min | Lateral direction | % | 0.6 | −2.9 | −0.6 |
| Wet tension | Corona treated surface | mN/m | 42 | 42 | 42 |
| Finished quality of bag ※ | — | — | ○ | x | ○ |
| Seal strength ※ | Longitudinal direction | N/15 mm | 50 | 24 | 22 |
|  | Piercing strength ※ | N | 23.8 | 16.9 | 18.4 |
| Tear strength ※ | Longitudinal direction | N | 0.18 | 0.36 | 0.31 |
| Tear strength ※ | Lateral direction | N | unmeasurable* | unmeasurable* | unmeasurable* |
| Straight cuttability ※ | Stretching direction | mm | 2 | 4 | 3 |
| Parting ※ | Stretching direction | mm | 3 | 7 | 7 |

|  |  |  | Comparative Example 4 | Comparative Example 5 | Comparative Example 6 |
|---|---|---|---|---|---|
| Laminate layer | Propylene-ethylene-butene random | Raw material A | — | — | — |
| Intermediate layer | Propylene-ethylene random | Raw material B | — | 100 | 100 |
|  | Butene-ethylene random | Raw material C | — | — | — |
|  | Propylene-ethylene block | Raw material D | 28 | — | 125 |
|  | Isotactic PP | Raw material E | 100 | — | — |
|  | Atactic PP | Raw material F | — | — | — |
|  | Ethylene-butene copolymeric elastomer | Raw material G | — | 82 | 25 |
|  | Propylene-butene copolymeric elastomer | Raw material H | — | — | — |
|  | Linear low-density polyethylene | Raw material I | — | — | — |
| Heat-seal layer | Propylene-ethylene-butene random | Raw material J | — | — | 100 |
|  | Propylene-ethylene random | Raw material B | — | 100 | — |
|  | Butene-ethylene random | Raw material C | — | — | — |
|  | Propylene-ethylene block | Raw material D | 28 | — | 50 |
|  | Isotactic PP | Raw material E | 100 | — | — |
|  | Atactic PP | Raw material F | — | — | — |
|  | Ethylene-butene copolymeric elastomer | Raw material G | — | — | 17 |
|  | Propylene-butene copolymeric elastomer | Raw material H | — | — | — |
|  | Linear low-density polyethylene | Raw material I | — | — | — |
|  | Anti-blocking agent | ppm | 3000 | 2400 | 2400 |
|  | Anti-blocking agent Particle diameter | μm | Silica 4.0 μm | Silica 4.0 μm | Silica 4.0 μm |
| Thickness | Laminate layer | μm | 10 | 2 | 17 |
|  | Intermediate layer | μm | 20 | 5 | 33 |
|  | Heat-seal layer | μm | 10 | 29 | 10 |
|  | Total | μm | 40 | 36 | 60 |
|  | Preheating temperature | ° C. | 135 | 80 | 105 |
|  | Stretching temperature | ° C. | 165 | 80 | 105 |
|  | Stretching direction | — | Lateral | Longitudinal | Longitudinal |
|  | Stetch ratio | time | 8.0 | 5.0 | 4.3 |
|  | Annealing treatment | ° C. | 155 | No | No |
|  | Haze | % | 6.1 | 6.0 | 36.7 |

TABLE 2-continued

| | | | | | |
|---|---|---|---|---|---|
| Friction coefficient | Non-treated surfaces | — | 0.25 | 0.14 | 0.41 |
| Tear strength | Longitudinal direction | N | 1.62 | 0.55 | 0.71 |
| Tear strength | Lateral direction | N | 0.31 | unmeasurable* | unmeasurable* |
| | Piercing strength | N | 4.3 | 4.6 | 9.8 |
| Piercing strength | Per 1 μm | N/μm | 0.11 | 0.13 | 0.16 |
| Accelerated blocking | Longitudinal direction | mN/70 mm | 34 | 52 | 657 |
| Martens hardness | Heat sealing surface | N/mm2 | 74 | 117 | 46 |
| Indentation creep rate (cit) | Heat sealing surface | % | 2.9 | 2.1 | 3.1 |
| X axis orientation | ΔNx | — | −0.0073 | 0.0273 | 0.0239 |
| Planar orientation | ΔP | — | 0.009 | 0.0140 | 0.0141 |
| | Melting point | °C. | 165 | 133 | 154 |
| Gelbo pinhole | 1° C. 1000 times | Number | 20 | 26 | 0 |
| Thermal shrinkage rate | Longitudinal direction | % | 1.3 | 36.4 | 33.4 |
| 120° C. 30 min | Lateral direction | % | 1.8 | −3.5 | −3.8 |
| Wet tension | Corona treated surface | mN/m | 42 | 42 | 42 |
| Finished quality of bag ※ — | | — | ○ | x | x |
| Seal strength ※ | Longitudinal direction | N/15 mm | 7 | 10.0 | 7 |
| | Piercing strength ※ | N | 12.1 | 18.5 | 22.5 |
| Tear strength ※ | Longitudinal direction | N | unmeasurable* | 0.11 | 0.21 |
| Tear strength ※ | Lateral direction | N | 0.18 | unmeasurable* | unmeasurable* |
| Straight cuttability ※ | Stretching direction | mm | 1 | 1 | 1 |
| Parting ※ | Stretching direction | mm | 2 | 2 | 2 |

| | | | | Comparative Example 7 | Comparative Example 8 |
|---|---|---|---|---|---|
| Laminate layer | Propylene-ethylene-butene random | Raw material A | | 100 | 100 |
| Intermediate layer | Propylene-ethylene random | Raw material B | | — | — |
| | Butene-ethylene random | Raw material C | | 100 | — |
| | Propylene-ethylene block | Raw material D | | — | — |
| | Isotactic PP | Raw material E | | — | — |
| | Atactic PP | Raw material F | | — | — |
| | Ethylene-butene copolymeric elastomer | Raw material G | | — | — |
| | Propylene-butene copolymeric elastomer | Raw material H | | — | — |
| | Linear low-density polyethylene | Raw material I | | — | — |
| Heat-seal layer | Propylene-ethylene-butene random | Raw material J | | 100 | 100 |
| | Propylene-ethylene random | Raw material B | | — | — |
| | Butene-ethylene random | Raw material C | | 100 | — |
| | Propylene-ethylene block | Raw material D | | — | — |
| | Isotactic PP | Raw material E | | — | — |
| | Atactic PP | Raw material F | | — | — |
| | Ethylene-butene copolymeric elastomer | Raw material G | | — | — |
| | Propylene-butene copolymeric elastomer | Raw material H | | — | — |
| | Linear low-density polyethylene | Raw material I | | — | — |
| | Anti-blocking agent | ppm | | 3000 | 2000 |
| | Anti-blocking agent Particle diameter | μm | | Silica 4.0 μm | Silica 4.0 μm |
| Thickness | Laminate layer | μm | | 5 | 5 |
| | Intermediate layer | μm | | 10 | 10 |
| | Heat-seal layer | μm | | 5 | 5 |
| | Total | μm | | 20 | 20 |
| | Preheating temperature | °C. | | 80 | 80 |
| | Stretching temperature | °C. | | 80 | 80 |
| | Stretching direction | — | | Longitudinal | Longitudinal |
| | Stetch ratio | time | | 5.0 | 4.0 |
| | Annealing treatment | °C. | | 100 | 130 |
| | Haze | % | | 2.8 | 2.5 |
| Friction coefficient | Non-treated surfaces | — | | 0.12 | 0.12 |
| Tear strength | Longitudinal direction | N | | 0.48 | 0.53 |
| Tear strength | Lateral direction | N | | unmeasurable* | unmeasurable* |
| | Piercing strength | N | | 2.2 | 3.1 |
| Piercing strength | Per 1 μm | N/μm | | 0.11 | 0.16 |
| Accelerated blocking | Longitudinal direction | mN/70 mm | | 61 | 41 |
| Martens hardness | Heat sealing surface | N/mm2 | | 115 | 112 |
| Indentation creep rate (cit) | Heat sealing surface | % | | 2.1 | 2.3 |
| X axis orientation | ΔNx | — | | 0.0275 | 0.0255 |
| Planar orientation | ΔP | — | | 0.0146 | 0.0135 |
| | Melting point | °C. | | 152 | 135 |
| Gelbo pinhole | 1° C. 1000 times | Number | | 28 | 26 |
| Thermal shrinkage rate | Longitudinal direction | % | | 11.8 | 8.1 |

TABLE 2-continued

| | | | | |
|---|---|---|---|---|
| 120° C. 30 min | Lateral direction | % | −0.5 | −0.1 |
| Wet tension | Corona treated surface | mN/m | 42 | 42 |
| Finished quality of bag ✗ | — | — | ◯ | ◯ |
| Seal strength ✗ | Longitudinal direction | N/15 mm | 19 | 9 |
| | Piercing strength ✗ | N | 17.0 | 16.9 |
| Tear strength ✗ | Longitudinal direction | N | 0.16 | 0.26 |
| Tear strength ✗ | Lateral direction | N | unmeasurable* | unmeasurable* |
| Straight cuttability ✗ | Stretching direction | mm | 5 | 2 |
| Parting ✗ | Stretching direction | mm | 12 | 3 |

The evaluation result expressed by "unmeasurable*" in Tables 1 and 2 indicates that the film was torn in the stretching direction during the evaluation of characteristics and no measurement value was obtained.

INDUSTRIAL APPLICABILITY

According to the present invention, it is possible to provide a package which is superior in transparency, sealability, bag-forming property, and bag breaking resistance and which is easily torn without parting. Therefore, the present invention can greatly contribute to the industry.

The invention claimed is:

1. A polyolefin-based resin film comprising a polyolefin-based resin composition, wherein the polyolefin-based resin composition comprises at least a propylene-α olefin random copolymer and the following 1) to 6) are satisfied:

1) A content of an olefin-based block copolymer is 0 to 2 parts by weight based on 100 parts by weight of the propylene-α olefin random copolymer in the polyolefin-based resin composition;

2) A content of an olefin-based copolymeric elastomer resin is 0 to 2 parts by weight based on 100 parts by weight of the propylene-α olefin random copolymer in the polyolefin-based resin composition;

3) A content of a propylene homopolymer is 0 to 40 parts by weight based on 100 parts by weight of the propylene-α olefin random copolymer in the polyolefin-based resin composition;

4) The polyolefin-based resin film exhibits a thermal shrinkage rate after heating at 120° C. for 30 minutes of 25% or less in a direction in which the thermal shrinkage rate after heating at 120° C. for 30 minutes is larger between a longitudinal direction and a lateral direction of the polyolefin-based resin film;

5) A planar orientation coefficient ΔP calculated from a refractive index of the polyolefin-based resin film is 0.0100 or more and 0.0145 or less; and 6) An orientation coefficient ΔNx in the longitudinal direction of the polyolefin-based resin film is 0.010 or more, the orientation coefficient ΔNx being calculated from Formula (1):

$$\Delta Nx = Nx - [(Ny + Nz)/2] \quad \text{Formula (1)}$$

wherein Nx is a refractive index in the longitudinal direction, Ny is a refractive index in a direction perpendicular to the longitudinal direction, and Nz is a refractive index in a plane direction.

2. The polyolefin-based resin film according to claim 1, wherein at least one surface of the polyolefin-based resin film has a Martens hardness of 80 N/mm$^2$ or more and an indentation creep rate (Cit) of 3.0% or less.

3. The polyolefin-based resin film according to claim 1, wherein the polyolefin-based resin film has a haze of 1% or more and 20% or less.

4. The polyolefin-based resin film according to claim 1, wherein the polyolefin-based resin film has a tear strength of 0.8 N or less in a direction in which the thermal shrinkage rate after heating at 120° C. for 30 minutes is larger between the longitudinal direction and the lateral direction of the polyolefin-based resin film.

5. The polyolefin-based resin film according to claim 1, wherein the polyolefin-based resin film has a piercing strength of 0.12 N/μm or more.

6. The polyolefin-based resin film according to claim 1, wherein a layer located on at least one surface of the polyolefin-based resin film has an anti-blocking agent concentration of 3000 ppm or less.

7. A laminate comprising:
the polyolefin-based resin film according to claim 1; and
a biaxially oriented film made of at least one polymer selected from the group consisting of a polyamide resin film, a polyester resin film, and a polypropylene resin film.

8. The laminate according to claim 7, wherein the laminate has a straight cuttability of 8 mm or less in a direction in which the thermal shrinkage rate after heating at 120° C. for 30 minutes is larger between a longitudinal direction and a lateral direction of the laminate, and has a tear strength of 0.8 N or less in a direction in which the thermal shrinkage rate is larger between the longitudinal direction and the lateral direction.

9. A package comprising the laminate according to claim 7.

* * * * *